US011100366B2

(12) United States Patent
Roy Chowdhury et al.

(10) Patent No.: US 11,100,366 B2
(45) Date of Patent: Aug. 24, 2021

(54) METHODS AND SYSTEMS FOR SEMI-AUTOMATED IMAGE SEGMENTATION AND ANNOTATION

(71) Applicant: Volvo Car Corporation, Gothenburg (SE)

(72) Inventors: Sohini Roy Chowdhury, Mountain View, CA (US); Andreas Wallin, Mountain View, CA (US); Sihao Ding, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 273 days.

(21) Appl. No.: 15/963,576

(22) Filed: Apr. 26, 2018

(65) Prior Publication Data
US 2019/0332893 A1 Oct. 31, 2019

(51) Int. Cl.
*G06K 9/00* (2006.01)
*G06K 9/62* (2006.01)
(Continued)

(52) U.S. Cl.
CPC .............. *G06K 9/6254* (2013.01); *B60R 1/00* (2013.01); *G06K 9/00812* (2013.01); *G06K 9/6261* (2013.01); *G06T 7/11* (2017.01); *B60R 2300/303* (2013.01); *B60R 2300/607* (2013.01); *B60R 2300/806* (2013.01);
(Continued)

(58) Field of Classification Search
None
See application file for complete search history.

(56) References Cited

U.S. PATENT DOCUMENTS 8,498,482 B2 7/2013 Varekamp
8,913,831 B2 12/2014 Bergman et al.
(Continued)

FOREIGN PATENT DOCUMENTS

CN 102142089 A 8/2011
CN 102436583 A 5/2012
(Continued)

OTHER PUBLICATIONS

Castrejon et al.:"Annotating Object Instances with a Polygon-RNN"; Cornell University Library; Apr. 19, 2017; pp. 1-9.
(Continued)

*Primary Examiner* — Wei Wen Yang
(74) *Attorney, Agent, or Firm* — Clements Bernard Walker; Christopher L. Bernard

(57) ABSTRACT

Methods and systems for digital image segmentation and annotation, including: receiving a digital image depicting, in part, an object of interest from an input file; one or more of manually and automatically adding a polygon around the object of interest to generate a segmented digital image; one or more of manually and automatically appending a label to the polygon around the object of interest to generate a segmented and annotated digital image, wherein the label indicates one or more of an identity and a characteristic of the object of interest; and outputting information related to the segmented and annotated digital image to an output file. Optionally, the polygon is one of a bounding box and a 4-point polygon. Optionally, the object of interest is a parking spot.

18 Claims, 15 Drawing Sheets

(51) Int. Cl.
*G06T 7/11* (2017.01)
*B60R 1/00* (2006.01)
*G08G 1/14* (2006.01)

(52) U.S. Cl.
CPC ............... *G06T 2207/10004* (2013.01); *G06T 2207/20081* (2013.01); *G06T 2207/30264* (2013.01); *G08G 1/14* (2013.01)

(56) References Cited

U.S. PATENT DOCUMENTS

| | | |
|---|---|---|
| 9,300,828 B1 | 5/2016 | Harary et al. |
| 2012/0134576 A1* | 5/2012 | Sharma ................ G06K 9/4604 382/155 |
| 2015/0294476 A1 | 10/2015 | Tang et al. |
| 2017/0270664 A1* | 9/2017 | Hoogi .................... A61B 6/469 |
| 2017/0344822 A1 | 11/2017 | Popescu et al. |
| 2018/0220589 A1* | 8/2018 | Burden ...................... G06T 7/11 |
| 2019/0050648 A1* | 2/2019 | Stojanovic .............. G06T 11/60 |
| 2019/0347802 A1* | 11/2019 | Linguraru ................ G06K 9/46 |

FOREIGN PATENT DOCUMENTS

| | | |
|---|---|---|
| CN | 104636761 A | 5/2015 |
| CN | 106022353 A | 10/2016 |

OTHER PUBLICATIONS

Petrovai et al.:"Semi-Automatic Image Annotation of Street Scenes";2017 IEEE Intelligent Vehicle Symposium(IV); Jun. 11-14, 2017; pp. 448-455.
Jul. 18, 2019 European Search Report issue on International Application No. EP19170520.

* cited by examiner

METHODS AND SYSTEMS FOR SEMI-AUTOMATED IMAGE SEGMENTATION AND ANNOTATION

FIELD OF THE DISCLOSURE

The present disclosure relates generally to methods and systems for the semi-automated segmentation and annotation of images. More specifically, the present disclosure relates to methods and systems for the semi-automated segmentation and annotation of images for training a vision-related machine learning model utilized by an Automated Driving System/Advanced Driver Assistance System (ADS/ADAS) or the like to identify and classify parking spots and other objects of interest.

BACKGROUND OF THE DISCLOSURE

A vision-related machine learning model utilized by an ADS/ADAS or the like uses segmented and annotated images, such as digital camera images or the like, to train itself for later automated detection tasks, such as the detection of parking spots, pedestrians, and the like, from real-time digital camera images. These segmented and annotated images are typically created manually using a software application. A user identifies an object of interest in a given image, defines the edges of the object of interest, places a bounding box around the object of interest, and then annotates the bounding box to label the object of interest for later reference. Image pixel characteristics and variations inside and outside of the annotated edges or bounding box are then analyzed, learned, and later utilized by the vision-related machine learning model to identify, classify, and react to a similar object of interest in real time. Advantageously, this manual user segmentation and annotation methodology is robust, as humans have years of training in accurately identifying and discriminating between objects of interest and their surroundings. Disadvantageously, this manual user segmentation and annotation methodology is time consuming, inefficient, and prone to error. For example, humans are not very adept at defining a best-fit edge or placing a best-fit bounding box around an object of interest, or at least not at doing so rapidly. This process can take hours. Given the large number and variety of images that must be segmented, annotated, and digested to adequately train a vision-related machine learning model utilized by an ADS/ADAS or the like, this is problematic.

Thus, what are still needed in the art are methods and systems for the semi-automated segmentation and annotation of images for training vision-related machine learning models utilized by an ADS/ADAS or the like to identify and classify parking spots and other objects of interest. Such methods and systems would speed up and improve the accuracy of the image segmentation and annotation process, thereby allowing the manufacturers and implementers of a vision-related machine learning model to operate more efficiently in the aggregate.

BRIEF SUMMARY OF THE DISCLOSURE

In various exemplary embodiments, the present disclosure provides methods and systems for the semi-automated segmentation and annotation of images for training vision-related machine learning models utilized by an ADS/ADAS or the like to identify and classify parking spots and other objects of interest. Given an image, such as a bird's eye view (BEV) image and/or a stitched image from one or more digital cameras, which may or may not be pre-annotated, these methods and systems involve a user selecting one or more fiduciary points associated with an object of interest. From the one or more selected fiduciary points, the software application is operable for automatically defining other fiduciary points and/or edges of the object of interest and either adding a bounding box or optimized polygon around the object of interest in an automated manner. Options are also available for manually adding such a bounding box or polygon. The bounding box is then adjusted, if necessary, and confirmed by the user. Likewise, the optimized polygon is then adjusted, if necessary, and confirmed by the user, with predetermined vertices (here, Vertex 1) identified to establish consistent polygon alignment, for example. Subsequently, an appropriate annotation is associated with the bounding box or polygon, either manually or in an automated manner. This annotation may be an object identifier, a visibility indicator, etc., and may be corrected manually as necessary. Finally, the segmented and annotated image is output to a Json/text file or the like for later use in training the vision-related machine learning model. The user interacts with the software application via a user-friendly graphical user interface (GUI). This whole process promotes accuracy and efficiency, especially in the determination of fiduciary points and/or edges and the placement of bounding boxes or optimized polygons.

The methods and systems of the present disclosure can function in either a development mode or a correction mode. In the development mode, an image is segmented and annotated from scratch. In the correction mode, a prior segmentation and annotation is corrected or updated using new criteria.

Although an ADS/ADAS is used as an example herein, it will be readily apparent to those of ordinary skill in the art that the methods and systems of the present disclosure can be used in any image segmentation and annotation application equally. Accordingly, examples related to generic object and parking spot detection provided herein are intended to be non-limiting for all purposes.

In one exemplary embodiment, the present disclosure provides a method for digital image segmentation and annotation, including: receiving a digital image depicting, in part, an object of interest from an input file; one or more of manually and automatically adding a polygon around the object of interest to generate a segmented digital image; one or more of manually and automatically appending a label to the polygon around the object of interest to generate a segmented and annotated digital image, wherein the label indicates one or more of an identity and a characteristic of the object of interest; and outputting information related to the segmented and annotated digital image to an output file. The digital image consists of one or more of a singular digital image, a stitched digital image including a plurality of sub-images, a standard digital image, and a bird's eye view digital image. Optionally, the polygon is one of a bounding box and a 4-point polygon. Manually adding the polygon around the object of interest includes manually identifying one or more vertices of the polygon, manually or automatically connecting the vertices of the polygon, and manually specifying one or more reference vertices from among the one or more vertices of the polygon. Automatically adding the polygon around the object of interest includes manually selecting a region of interest associated with the object of interest, automatically displaying one or more of fiduciary points and fiduciary edges around the object of interest, manually brushing edges around the object of interest guided by the one or more of the fiduciary points and the fiduciary edges, and automatically convex hull estimating and displaying a polygon that encompasses all brushed pixels. The convex hull estimating includes estimating a largest diagonal that fits within the polygon that encompasses all the brushed pixels, specifying the largest diagonal by its endpoints, and traversing vertices of the polygon that encompasses all the brushed pixels in both clockwise and counterclockwise directions, wherein selected vertices that maximize an area of a triangle formed by the largest diagonal and the selected vertices in the clockwise and counterclockwise directions are selected as fiduciary points of the polygon that encompasses all the brushed pixels. Optionally, the method also includes manually editing the polygon that encompasses all the brushed pixels, if necessary, identifying a reference vertex from among vertices of the polygon that encompasses all the brushed pixels, and, if necessary, circular shifting the vertices such that the reference vertex coincides with a predetermined reference position. Optionally, the characteristic of the object of interest is determined by creating a binary mask corresponding to the polygon, gradient filtering red, green, and blue planes of the digital image to generate a gradient filtered image, superimposing the binary mask on the gradient filtered image, and characterizing/labeling the object of interest based on a mean and a standard deviation of pixel intensities of the superimposed binary mask and gradient filtered image. For example, this characterization refers to labeling a parking spot as belonging to a particular predetermined category (normal, disability, emergency, no parking, etc.). The method further includes one or more of: in a standard learning mode, generating an annotated data set and using the annotated data set as a training data set to train a machine learning/deep learning module to generate automated labels for subsequent data sets; and, in an active learning mode, manually annotating a small data set, using the annotated small data set to train the machine learning/ deep learning module and generating annotations for a new small data set i=1, using the new small annotated data set i=1 as a pre-annotation data set and making manual corrections thereto, using the new small annotated data set i=1 to retrain the machine learning/deep learning module after the manual corrections are made, iterating this process for a predetermined number of subsequent new small annotated data sets i=i+1, and automatically annotating a large data set.

In another exemplary embodiment, the present disclosure provides a system for digital image segmentation and annotation, including a memory storing machine readable instructions that when executed by a processor cause the system to: receive a digital image depicting, in part, an object of interest from an input file; one or more of manually and automatically add a polygon around the object of interest to generate a segmented digital image; one or more of manually and automatically append a label to the polygon around the object of interest to generate a segmented and annotated digital image, wherein the label indicates one or more of an identity and a characteristic of the object of interest; and output information related to the segmented and annotated digital image to an output file. Optionally, the polygon is one of a bounding box and a 4-point polygon. Manually adding the polygon around the object of interest includes manually identifying one or more vertices of the polygon, manually or automatically connecting the vertices of the polygon, and manually specifying one or more reference vertices from among the one or more vertices of the polygon. Automatically adding the polygon around the object of interest includes manually selecting a region of interest associated with the object of interest, automatically displaying one or more of fiduciary points and fiduciary edges around the object of interest, manually brushing edges around the object of interest guided by the one or more of the fiduciary points and the fiduciary edges, and automatically convex hull estimating and displaying a polygon that encompasses all brushed pixels. The convex hull estimating includes estimating a largest diagonal that fits within the polygon that encompasses all the brushed pixels, specifying the largest diagonal by its endpoints, and traversing vertices of the polygon that encompasses all the brushed pixels in both clockwise and counterclockwise directions, wherein selected vertices that maximize an area of a triangle formed by the largest diagonal and the selected vertices in the clockwise and counterclockwise directions are selected as fiduciary points of the polygon that encompasses all the brushed pixels. Optionally, the system also allows for manually editing the polygon that encompasses all the brushed pixels, if necessary, identifying a reference vertex from among vertices of the polygon that encompasses all the brushed pixels, and, if necessary, circular shifting the vertices such that the reference vertex coincides with a predetermined reference position. Optionally, the characteristic of the object of interest is determined by creating a binary mask corresponding to the polygon, gradient filtering red, green, and blue planes of the digital image to generate a gradient filtered image, superimposing the binary mask on the gradient filtered image, and characterizing/labeling the object of interest based on a mean and a standard deviation of pixel intensities of the superimposed binary mask and gradient filtered image. Again, for example, this characterization refers to labeling a parking spot as belonging to a particular predetermined category (normal, disability, emergency, no parking, etc.). The system further operates in one or more of: a standard learning mode operable for generating an annotated data set and using the annotated data set as a training data set to train a machine learning/deep learning module to generate automated labels for subsequent data sets; and an active learning mode operable for manually annotating a small data set, using the annotated small data set to train the machine learning/deep learning module and generating annotations for a new small data set i=1, using the new small annotated data set i=1 as a pre-annotation data set and making manual corrections thereto, using the new small annotated data set i=1 to retrain the machine learning/deep learning module after the manual corrections are made, iterating this process for a predetermined number of subsequent new small annotated data sets i=i+1, and automatically annotating a large data set.

BRIEF DESCRIPTION OF THE DRAWINGS

The present disclosure is illustrated and described herein with reference to the various drawings, in which like reference numbers are used to denote like method steps/system components, as appropriate, and in which.

DETAILED DESCRIPTION OF THE DISCLOSURE

Figure 1:
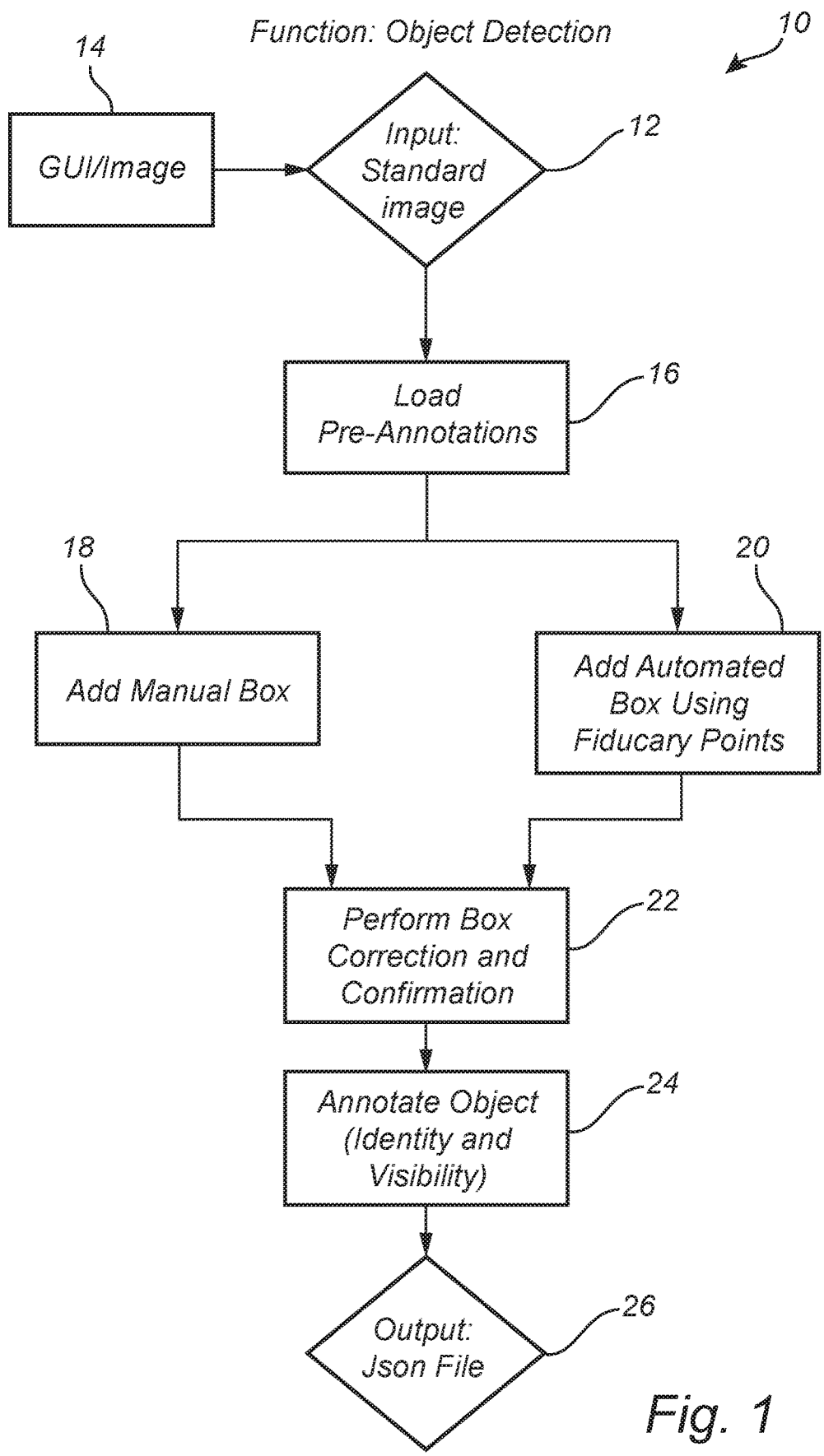
FIG. 1 is a flowchart illustrating one exemplary embodiment of the semi-automated image segmentation and annotation algorithm of the present disclosure, highlighting the detection of a generic object of interest.

Referring now specifically to FIG. 1, in one exemplary embodiment, the image segmentation and annotation algorithm 10 includes first receiving a digital camera image or the like 12 via a GUI 14 operating on an appropriate processing and display device. The image may be a standard image, a BEV image, and/or a stitched image consisting of a plurality of sub-images. For example, the standard image (whether singular or stitched) may be from a forward, rearward, and/or sideward-facing digital camera or cameras mounted on a vehicle and designed to scan for other vehicles, pedestrians, signs, obstacles, debris, and/or the like. The BEV image (whether singular or stitched) may be from a downward-facing digital fisheye camera or cameras mounted on the vehicle and designed to scan for parking spot lines, road lines, and/or the like. Such BEV images are extremely useful in low-speed vehicular maneuvering applications, such as autonomous parking and parking guidance, as they can provide a 360-degree ground view. Optionally, the image is loaded with one or more pre-annotations 16, created manually or automatically, when the image segmentation and annotation algorithm 10 is operated in a correction mode, as opposed to a development mode in which the image is segmented and annotated from scratch. In the correction mode, the pre-annotations are displayed along with the image on the GUI 14 and the input image/annotation file may also be used as the output image/annotation file. In the development mode, the image is displayed on the GUI 14 and an empty output image/annotation file is created.

In this exemplary embodiment, object detection is considered and the received image is preferably a singular or stitched standard image. The user has the option of manually adding a bounding box around an object of interest 18. To manually add this bounding box, a dummy bounding box is generated and the user drags and sizes it to tightly conform to the object of interest. Disadvantageously, manual error can be introduced here due to inter-user variability. Thus, the user also has the option of adding an automated bounding box using fiduciary points/edges 20. To add an automated bounding box, the user clicks on a region of interest (ROI) associated with the object of interest and "canny edge" filtered fiduciary points/edges are displayed around the object of interest. These edges can then be brushed (collectively selected) by the user. From these brushed edges, the software application then estimates and displays a convex bounding box that houses all of the brushed pixels. This automated bounding box has lower error (due to the use of automatically generated fiduciary edges) and is generated faster than by manually dragging a bounding box around the object of interest. Additionally, the automated bounding box reduces inter-observer variabilities across manual annotators. The bounding box is then subject to marginal correction by the user, as necessary, and confirmation 22. Subsequently, each bounding box is manually tagged with an appropriate identifier and, optionally, a visibility annotation that indicates a relative degree of visibility of the associated object of interest 24. Other suitable annotations may also be appended to the bounding box(es). Finally, the segmented and annotated image information is outputted to a Json file, txt file, or the like or saved as an image file or black-and-white bit map image indicative of the black background and white foreground pixels, respectively 26. In the case of object detection, object coordinates are saved in the form of [x,y,w,h] with the corresponding object label. Here, (x,y) refers to the top left corner of the bounding box and (w,h) refers to the object width and object height, respectively. Other conventions can be adopted as dictated by a given application.

Figure 2:
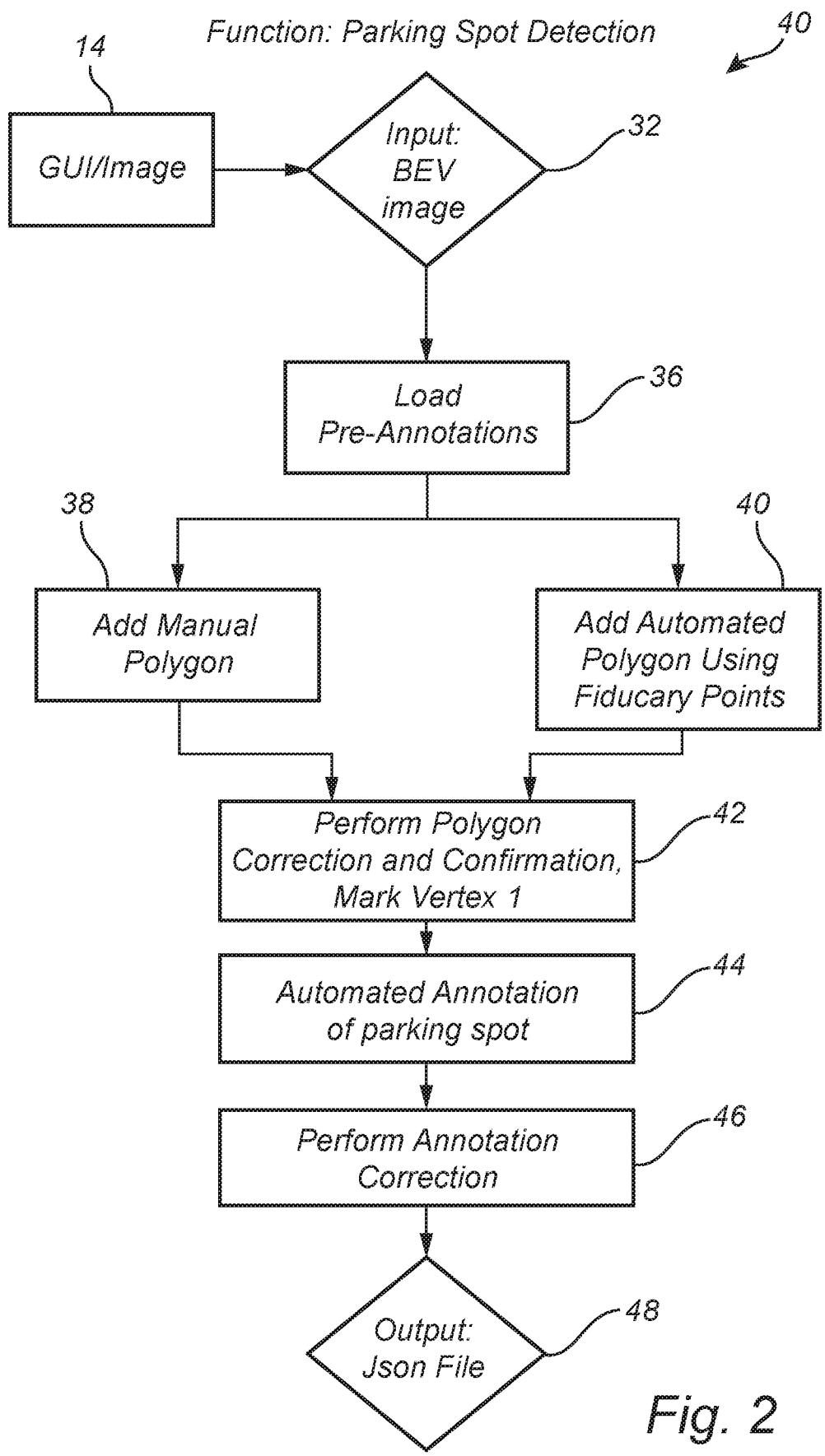
FIG. 2 is a flowchart illustrating another exemplary embodiment of the semi-automated image segmentation and annotation algorithm of the present disclosure, highlighting the detection of a parking spot or other geometric object of interest.

Referring now specifically to FIG. 2, in another exemplary embodiment, the image segmentation and annotation algorithm 30 includes first receiving a digital camera image or the like 32 via the GUI 14 operating on an appropriate processing and display device. Again, the image may be a standard image, a BEV image, and/or a stitched image consisting of a plurality of sub-images. For example, the standard image (whether singular or stitched) may be from a forward, rearward, and/or sideward-facing digital camera or cameras mounted on a vehicle and designed to scan for other vehicles, pedestrians, signs, obstacles, debris, and/or the like. The BEV image (whether singular or stitched) may be from a downward-facing digital fisheye camera or cameras mounted on the vehicle and designed to scan for parking spot lines, road lines, and/or the like. Such BEV images are extremely useful in low-speed vehicular maneuvering applications, such as autonomous parking and parking guidance, as they can provide a 360-degree ground view. Optionally, the image is again loaded with one or more pre-annotations 36, created manually or automatically, when the image segmentation and annotation algorithm 30 is operated in a correction mode, as opposed to a development mode in which the image is segmented and annotated from scratch. In the correction mode, the pre-annotations are displayed along with the image on the GUI 14 and the input image/annotation file may also be used as the output image/annotation file. In the development mode, the image is displayed on the GUI 14 and an empty output image/annotation file is created.

In this exemplary embodiment, parking spot detection is considered and the received image is preferably a singular or stitched BEV image. The user has the option of manually adding a 4-point polygon around a parking spot in the BEV image 38. To manually add this 4-point polygon, the vertices of the 4-point polygon are selected by the user and these vertices are automatically connected. As the orientation of a parking spot is crucially important, it is imperative that the 4-point polygon must begin and end at the same vertex (Vertex 1), which may optionally be defined as the bottom left corner of the parking spot as a vehicle would enter the parking spot. Vertex 1 should be the first vertex selected for manual 4-point polygon creation. Preferably, the GUI provides a zoom-in/zoom-out feature for more accurate manual 4-point polygon creation and the reduction of human error. Again, the user also has the option of adding an automated 4-point polygon using fiduciary points/edges 40. To add an automated 4-point polygon, the user clicks on a ROI associated with the parking spot and "canny edge" filtered fiduciary points/edges are displayed around the parking spot. These edges can then be brushed (collectively selected) by the user. From these brushed edges, the software application then estimates and displays a convex 4-point polygon that houses all of the brushed pixels. Preferably, this function utilizes a 4-point estimator function using convex hull points. The function first estimates the largest diagonal that fits within the 4-point polygon, with the two endpoints of this diagonal, (a,b), specified. Second, the vertices between (a,b) are traversed in clockwise and counterclockwise directions (two iterations). In each iteration, a new vertex that maximizes the area of the triangle formed by the diagonal and the new vertex is selected. For example, if vertices c and d are selected in the clockwise and counterclockwise directions, respectively, then vertices (a,c,b,d) define the automated convex hull 4-point polygon for the parking spot. Again, this automated 4-point polygon has lower error (due to the use of automatically generated fiduciary edges) and is generated faster than by manually selecting a 4-point polygon around the parking spot. Additionally, the automated 4-point polygon reduces inter-observer variabilities across manual annotators. This solution for automatically estimating a 4-point polygon of largest area is optimized for computational complexity, in contrast to a grid search for four vertices, for example. The 4-point polygon is then subject to marginal correction by the user, as necessary, and confirmation 42. Since the automated determination of Vertex 1 would be difficult, this confirmation includes the user manually selecting Vertex 1. Based on the relative position of Vertex 1 in the list of 4-point polygon vertices, the vertices may be subjected to circular shifting to ensure that Vertex 1 is the first vertex listed. Although the use of a 4-point polygon (with a specific Vertex 1) is described herein, it will be readily apparent to one of ordinary skill in the art that another type of polygon with fewer or more vertices may be used equally.

Subsequently, each 4-point polygon is automatically labeled with an appropriate identifier 44. Since the color and texture of each type of parking spot is distinctive, a binary mask corresponding to the 4-point polygon is created and superimposed on the gradient filtered image obtained by gradient filtering the red, green, and blue planes of the BEV image, respectively. The mean and standard deviation of the pixel intensities of the mask and gradient filtered images are used to separate "normal" parking spots from "disability" parking spots from "other" parking spots, for example. This aides in the automated labeling of each 4-point polygon, and these concepts extend beyond the automated labeling of parking spots. As the 4-point polygon may be disposed along the inside edges of the associated parking spot, the identifying line color may fall outside of the 4-point polygon. Thus, to enable this function, the 4-point polygon may be slightly expanded to couple it with its clustered average line color. Again, other suitable annotations may also be appended to the 4-point polygons. In some situations, a "normal" parking spot adjacent to a "disability" parking spot may be falsely labeled as a "disability" parking spot or the like. Such errors are manually corrected by iterating through each automated label and making suitable corrections 46.

Finally, the segmented and annotated image information is outputted to a Json file, txt file, or the like or saved as an image file or black-and-white bit map image indicative of the black background and white foreground pixels, respectively 48. In the case of parking spot detection, object coordinates are saved in the form of [x1,y1,x2,y2,x3,y3,x4,y4] with the corresponding parking spot label. Here, (xi,yi) refers to the coordinates of the 'i'th vertex of the four vertices of the 4-point polygon. Other conventions can be adopted as dictated by a given application.

Figure 3:
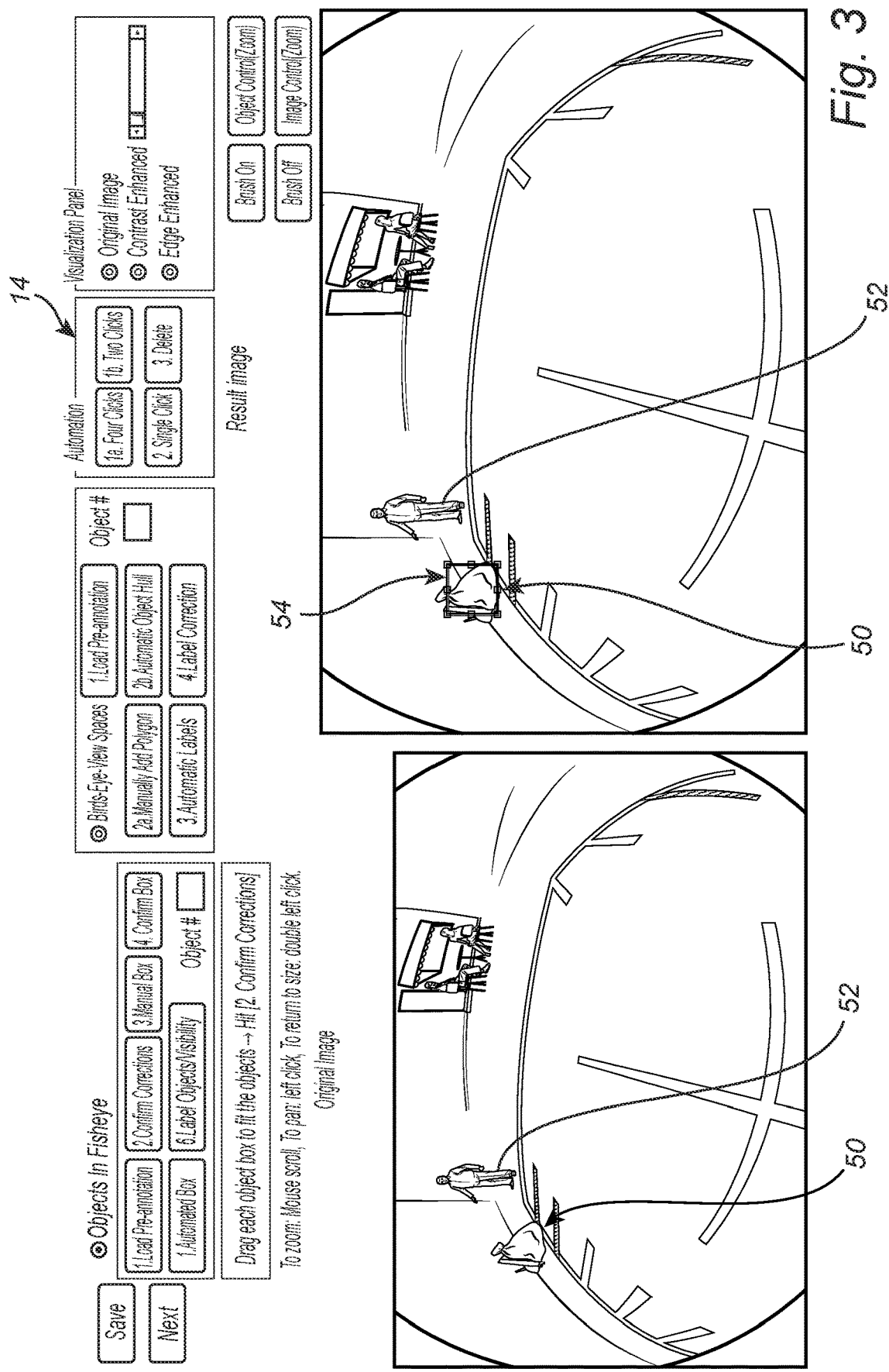
FIG. 3 is an exemplary fisheye camera image depicting one or more objects of interest displayed on the GUI of the present disclosure, the fisheye camera image optionally including pre-annotations loaded in from an existing Json/text file and displayed on the fisheye camera image.

Related to object detection, FIG. 3 is an exemplary fisheye camera image depicting one or more objects of interest 50 and 52 displayed on the GUI 14. The fisheye camera image includes a pre-annotation 54, i.e., a bounding box, loaded in from an existing Json/text file and displayed on the fisheye camera image. Again, it will be readily apparent to those of ordinary skill in the art that the fisheye camera image may be replaced by any other type of camera image, whether singular or stitched, and any type of object (s) of interest may be depicted equally.

Figure 4:
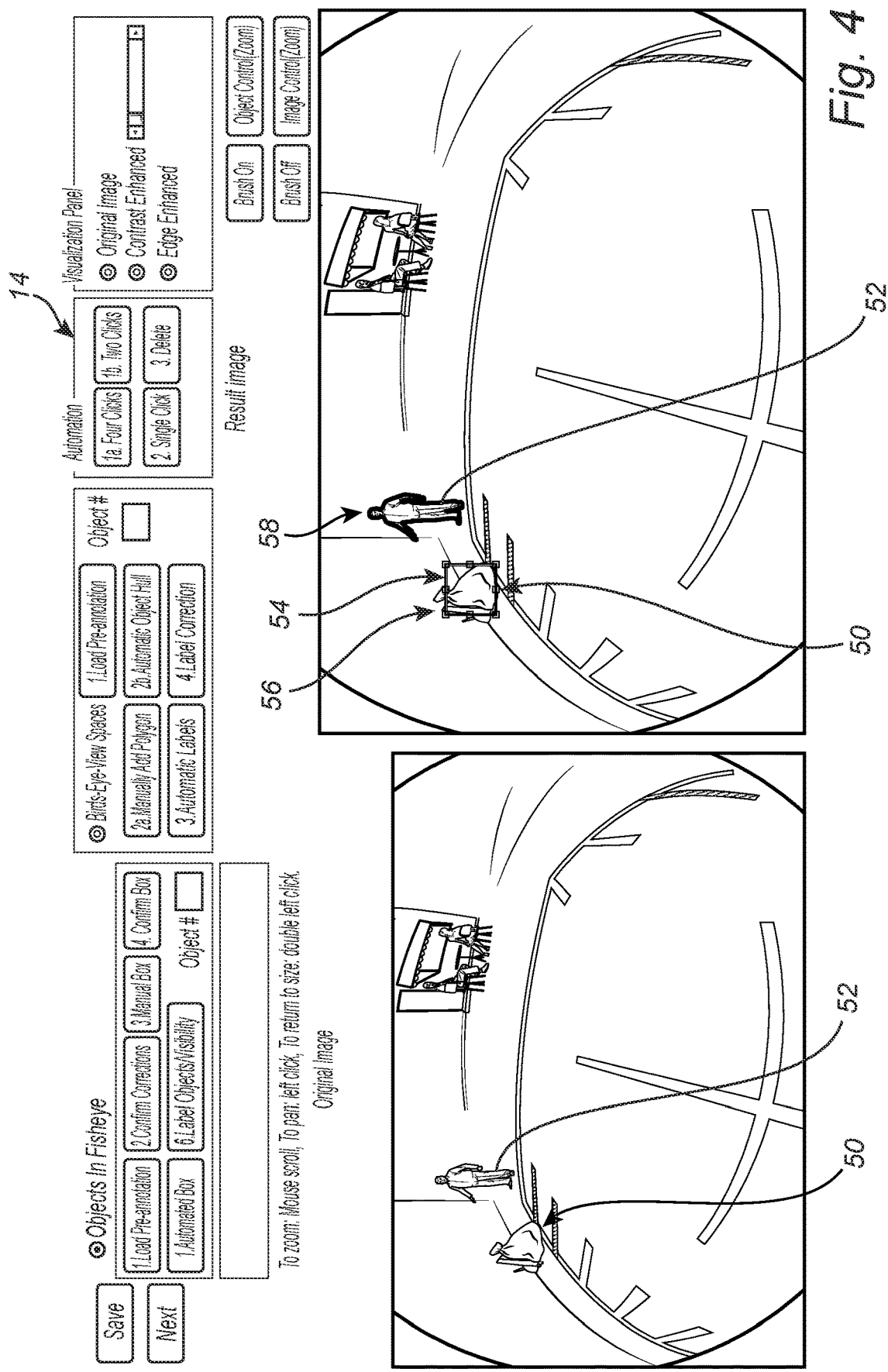
FIG. 4 is an exemplary fisheye camera image displayed on the GUI of the present disclosure, highlighting the automated selection of fiduciary points/edges and the placement of a bounding box around an object of interest using the image segmentation and annotation algorithm.

FIG. 4 is an exemplary fisheye camera image displayed on the GUI 14, highlighting the automated selection of fiduciary points/edges 56 and the placement of a bounding box 58 around an object of interest 50 using the image segmentation and annotation algorithm 10 (FIG. 1). The brushing of edges 58 in a specific ROI around an object of interest 52 is also illustrated.

Figure 5:
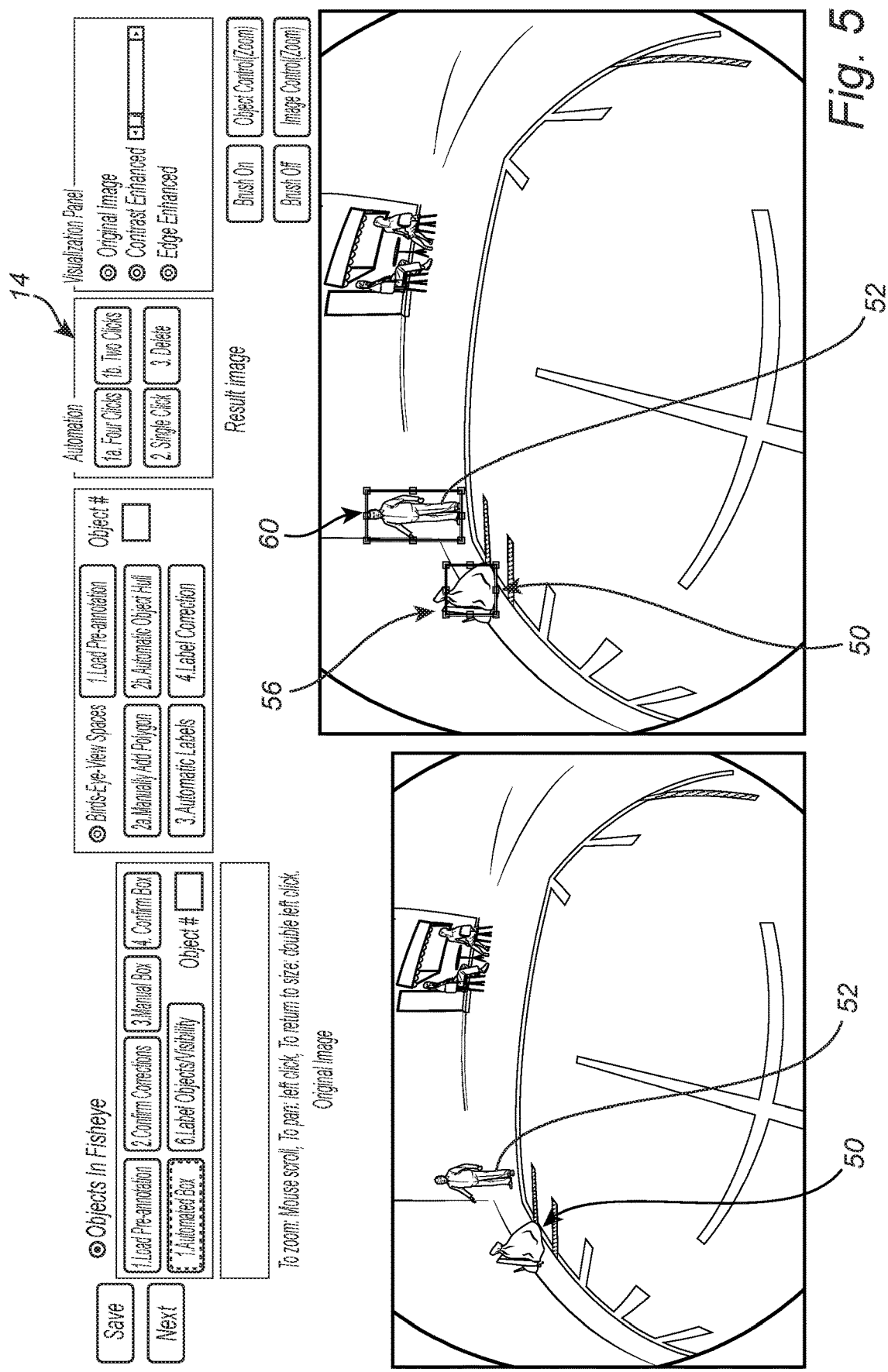
FIG. 5 is an exemplary fisheye camera image displayed on the GUI of the present disclosure, highlighting the automated placement and manual correction of bounding boxes disposed around objects of interest using the image segmentation and annotation algorithm.

FIG. 5 is an exemplary fisheye camera image displayed on the GUI 14, highlighting the automated placement and manual correction of bounding boxes 56 and 60 disposed around objects of interest 50 and 52 using the image segmentation and annotation algorithm 10. These bounding boxes 56 and 60 are moved, and optionally resized, to fit tightly around the objects of interest 50 and 52.

Figure 6:
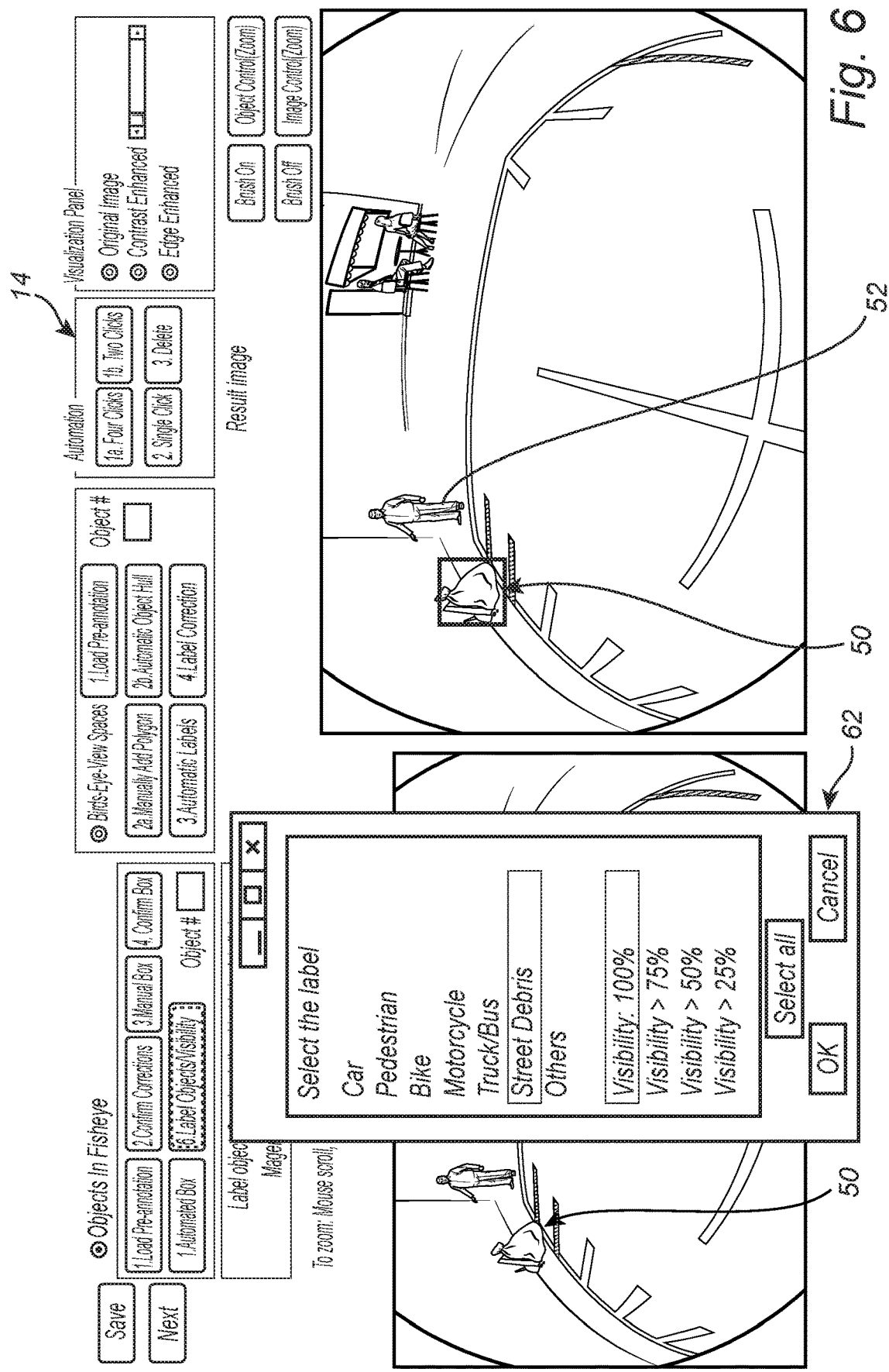
FIG. 6 is an exemplary fisheye camera image displayed on the GUI of the present disclosure, highlighting the manual labeling of an object of interest as "street debris" with "100% visibility" using the image segmentation and annotation algorithm.

FIG. 6 is an exemplary fisheye camera image displayed on the GUI 14, highlighting the manual labeling of an object of interest 50 as "street debris" with "100% visibility" using a drop-down menu 62 associated with the image segmentation and annotation algorithm 10.

Figure 7:
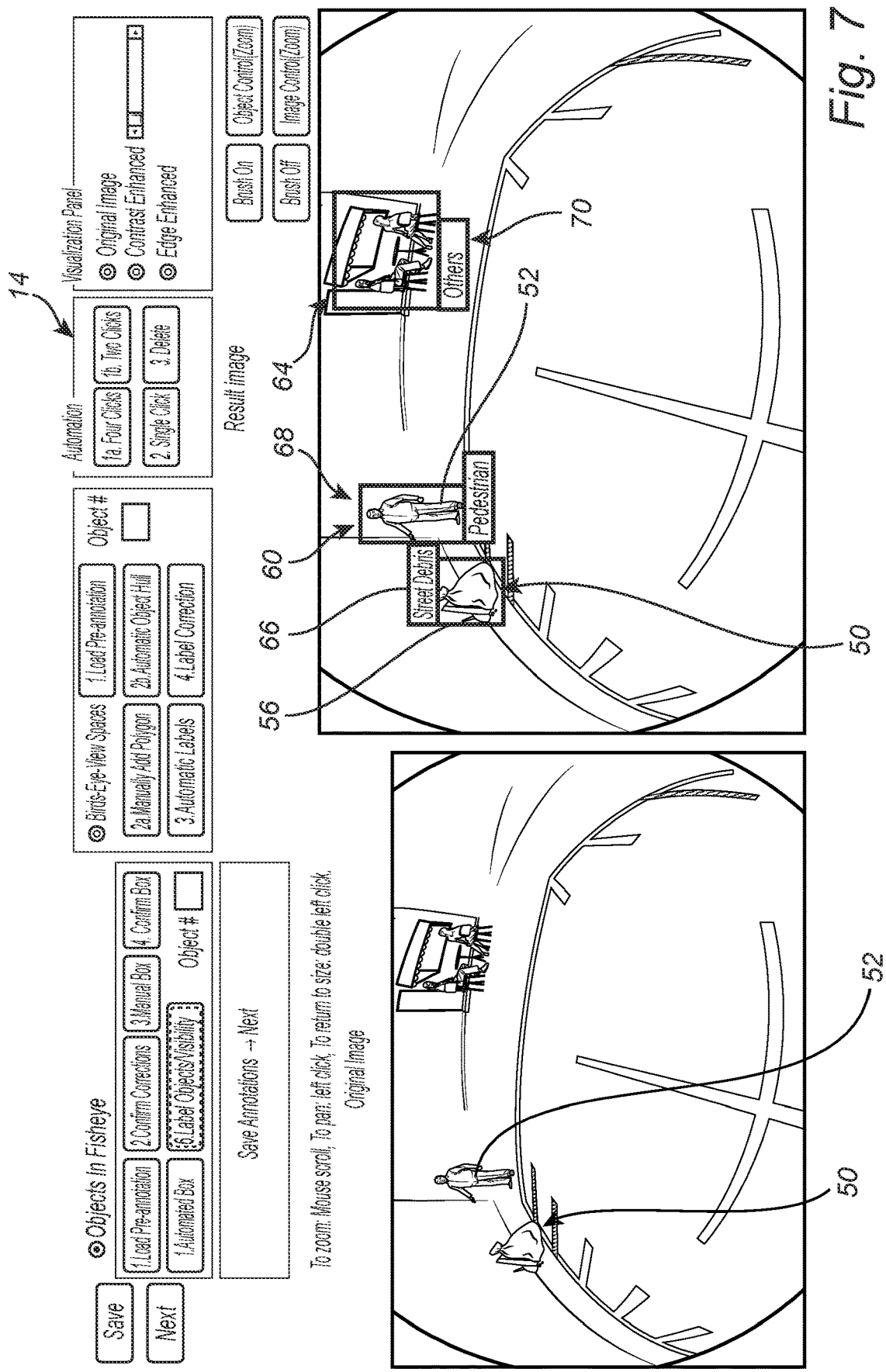
FIG. 7 is an exemplary fisheye camera image displayed on the GUI of the present disclosure, highlighting several objects of interest fully segmented and annotated as "street debris," "pedestrian," and "others," respectively, using the image segmentation and annotation algorithm.

FIG. 7 is an exemplary fisheye camera image displayed on the GUI 14, highlighting several objects of interest 50, 52, and 64 fully segmented and annotated as "street debris" 66, "pedestrian" 68, and "others" 70, respectively, using the image segmentation and annotation algorithm 10.

Figure 8:
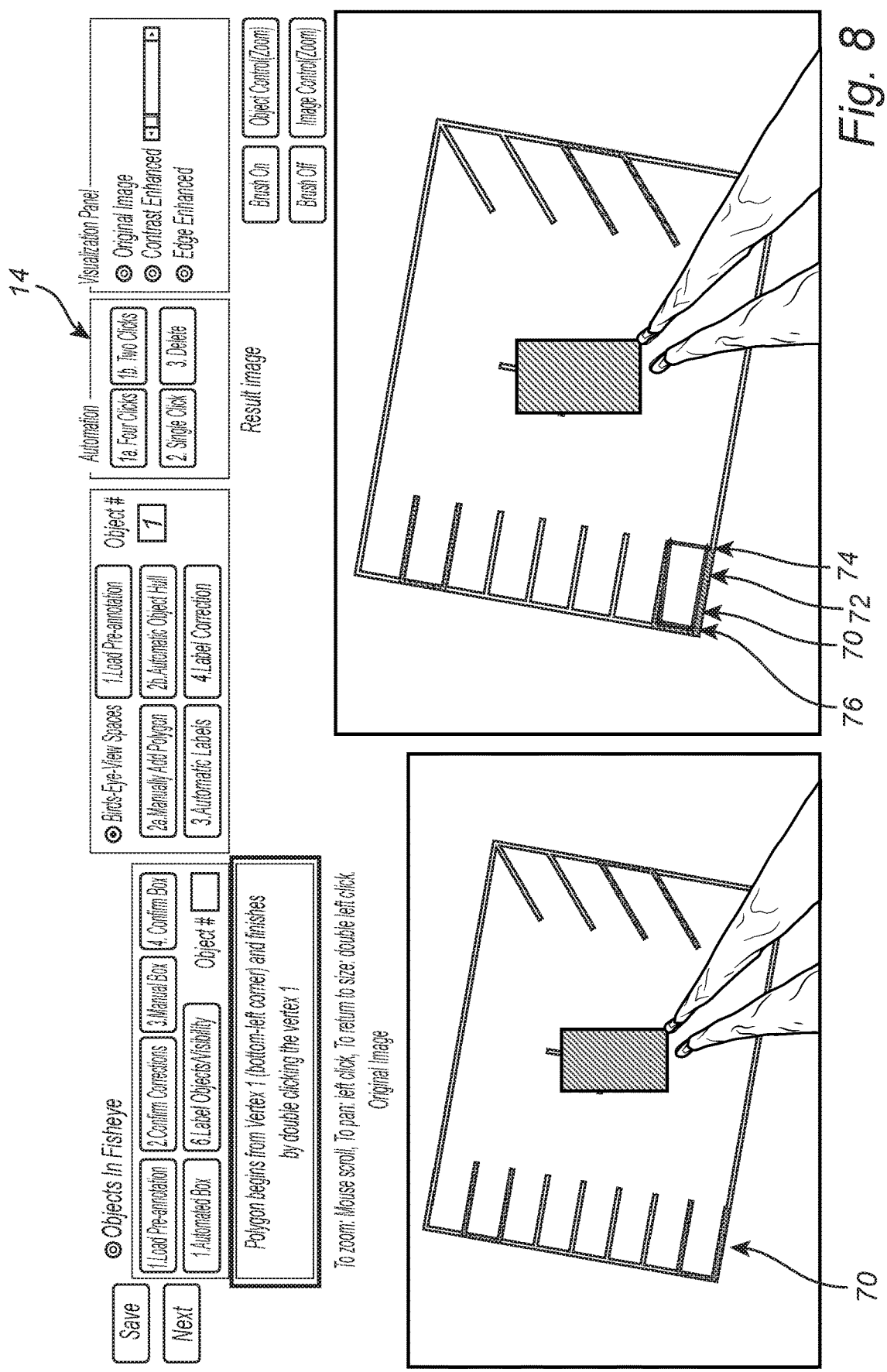
FIG. 8 is an exemplary stitched BEV camera image displayed on the GUI of the present disclosure, highlighting the manual segmentation of a parking spot using a 4-point polygon formed via the selection of the associated vertices using the image segmentation and annotation algorithm.

Similarly, related to parking spot detection, FIG. 8 is an exemplary stitched BEV camera image displayed on the GUI 14, highlighting the manual segmentation of a parking spot 70 using a 4-point polygon 72 formed via the selection of the associated vertices 74 using the image segmentation and annotation algorithm 40 (FIG. 2). Vertex 1 76 at the bottom-left corner of the parking spot 70 is used as the starting and stopping point for the 4-point polygon 72 by convention. As described above, the 4-point polygon 72 is disposed along the inside edges of the parking spot 70 such that the identifying line color falls outside of the 4-point polygon 70. Thus, to enable automated recognition and labeling, the 4-point polygon 70 may later be slightly expanded to couple it with its clustered average line color.

Figure 9:
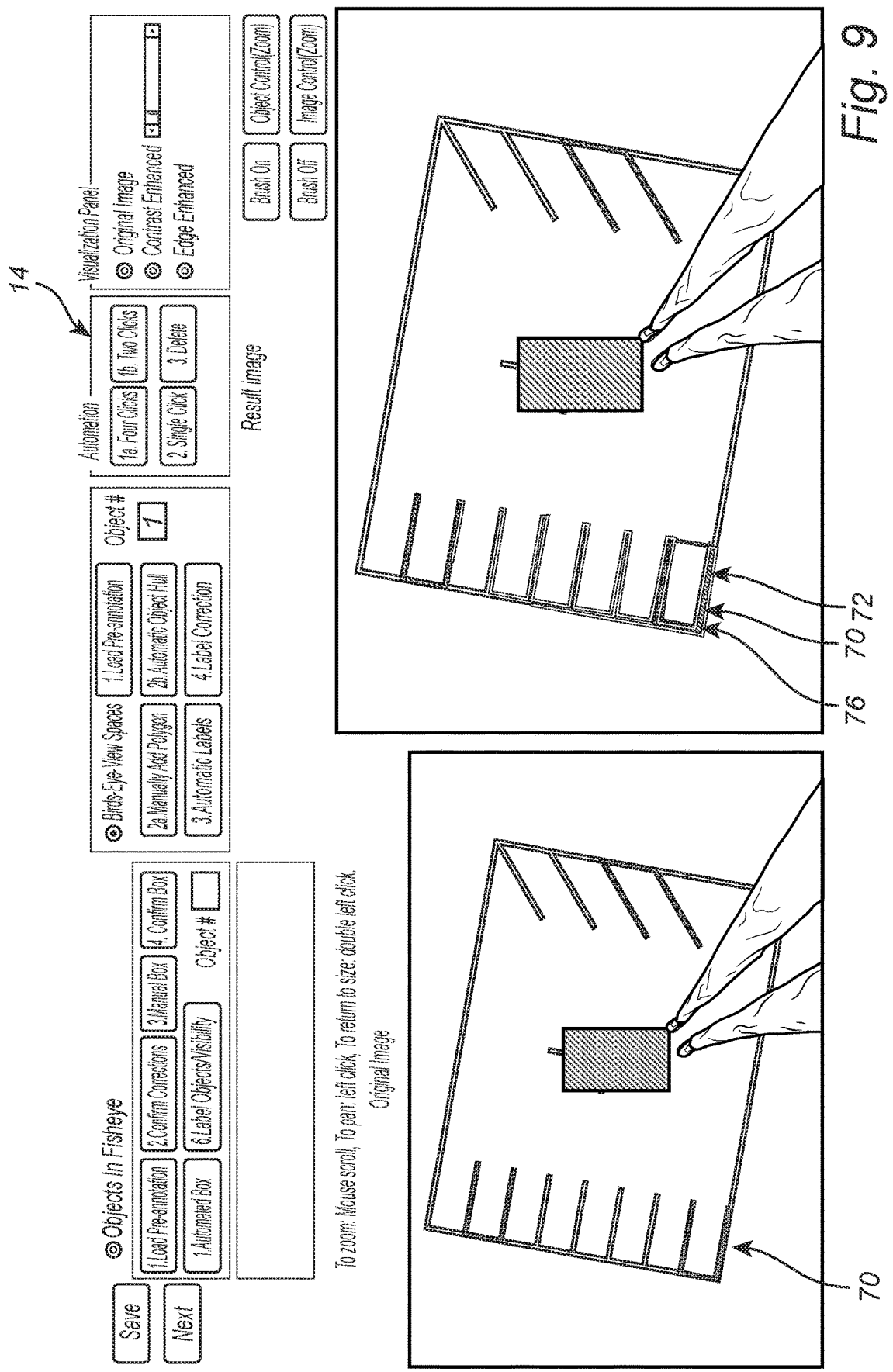
FIG. 9 is an exemplary stitched BEV camera image displayed on the GUI of the present disclosure, highlighting automated fiduciary edge detection enabling the automated placement of a hull estimation 4-point polygon around a parking spot using the image segmentation and annotation algorithm.

FIG. 9 is an exemplary stitched BEV camera image displayed on the GUI 14, highlighting automated fiduciary edge detection 76 enabling the automated placement of a convex hull estimation 4-point polygon 72 around a parking spot 72 using the image segmentation and annotation algorithm 40. Again, this function utilizes a 4-point estimator function that first estimates the largest diagonal that fits within the 4-point polygon 72, with the two endpoints of this diagonal, (a,b), specified. Second, the vertices between (a,b) are traversed in clockwise and counterclockwise directions (two iterations). In each iteration, a new vertex that maximizes the area of the triangle formed by the diagonal and the new vertex is selected. For example, if vertices c and d are selected in the clockwise and counterclockwise directions, respectively, then vertices (a,c,b,d) define the automated convex hull 4-point polygon 72 for the parking spot 70.

Figure 10:
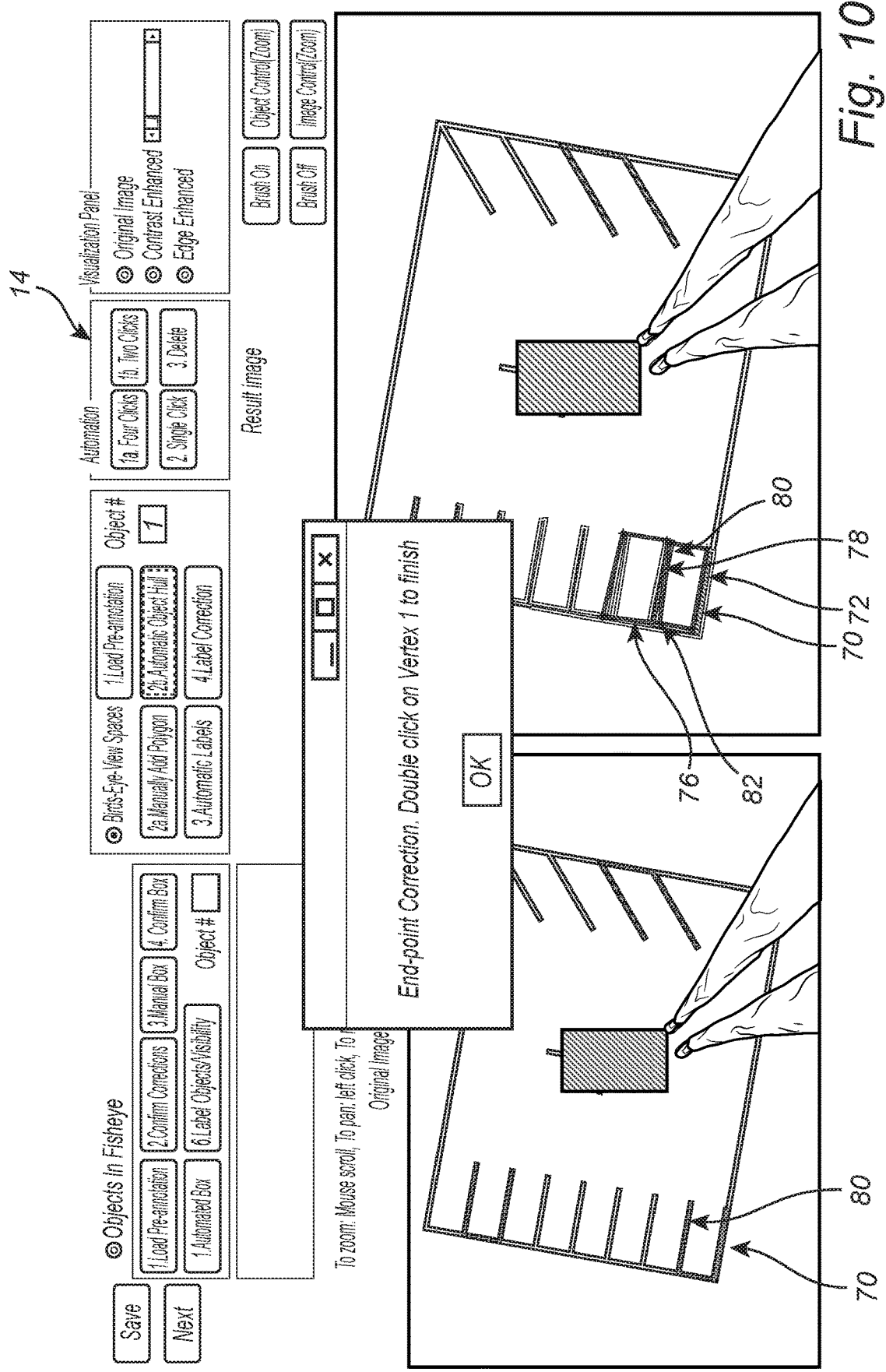
FIG. 10 is an exemplary stitched BEV camera image displayed on the GUI of the present disclosure, highlighting automated 4-point polygon placement around a parking spot after brushed fiduciary edge selection using the image segmentation and annotation algorithm.

FIG. 10 is an exemplary stitched BEV camera image displayed on the GUI 14, highlighting automated 4-point polygon 78 placement around a parking spot 80 after brushed fiduciary edge selection 76 using the image segmentation and annotation algorithm 40. Following optional manual correction of the automated 4-point polygon 78, the user must select Vertex 1 82 to complete the segmentation operation, as indicated.

Figure 11:
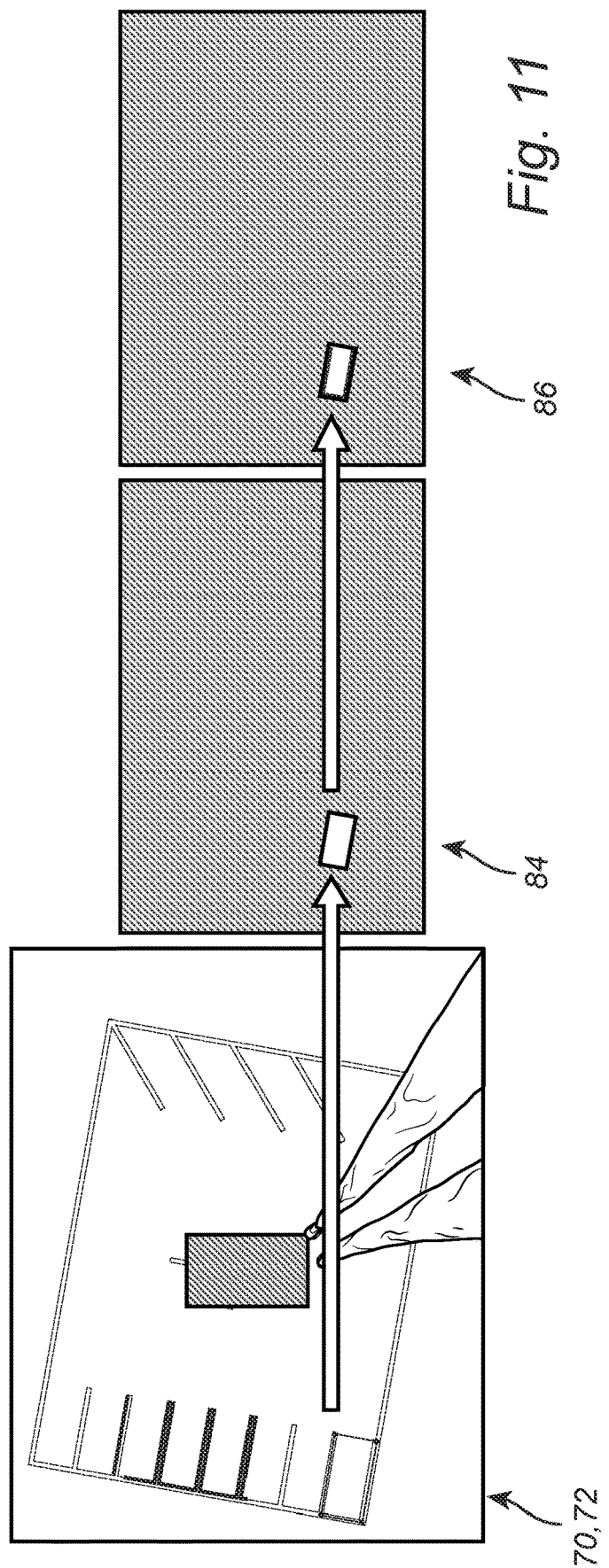
FIG. 11 is an exemplary stitched BEV camera image, highlighting the automated labeling of a parking spot segmented using the image segmentation and annotation algorithm.

FIG. 11 is an exemplary stitched BEV camera image, highlighting the automated labeling of a parking spot 70 segmented using the image segmentation and annotation algorithm 40. Again, since the color and texture of each type of parking spot is distinctive, a binary mask 84 corresponding to the 4-point polygon 72 is created and superimposed on the gradient filtered image 86 obtained by gradient filtering the red, green, and blue planes of the stitched BEV image, respectively. The mean and standard deviation of the pixel intensities of the mask and gradient filtered images 84 and 86 are used to separate "normal" parking spots from "disability" parking spots from "other" parking spots, for example. This aides in the automated labeling of each 4-point polygon, and these concepts extend beyond the automated labeling of parking spots.

Figure 12:
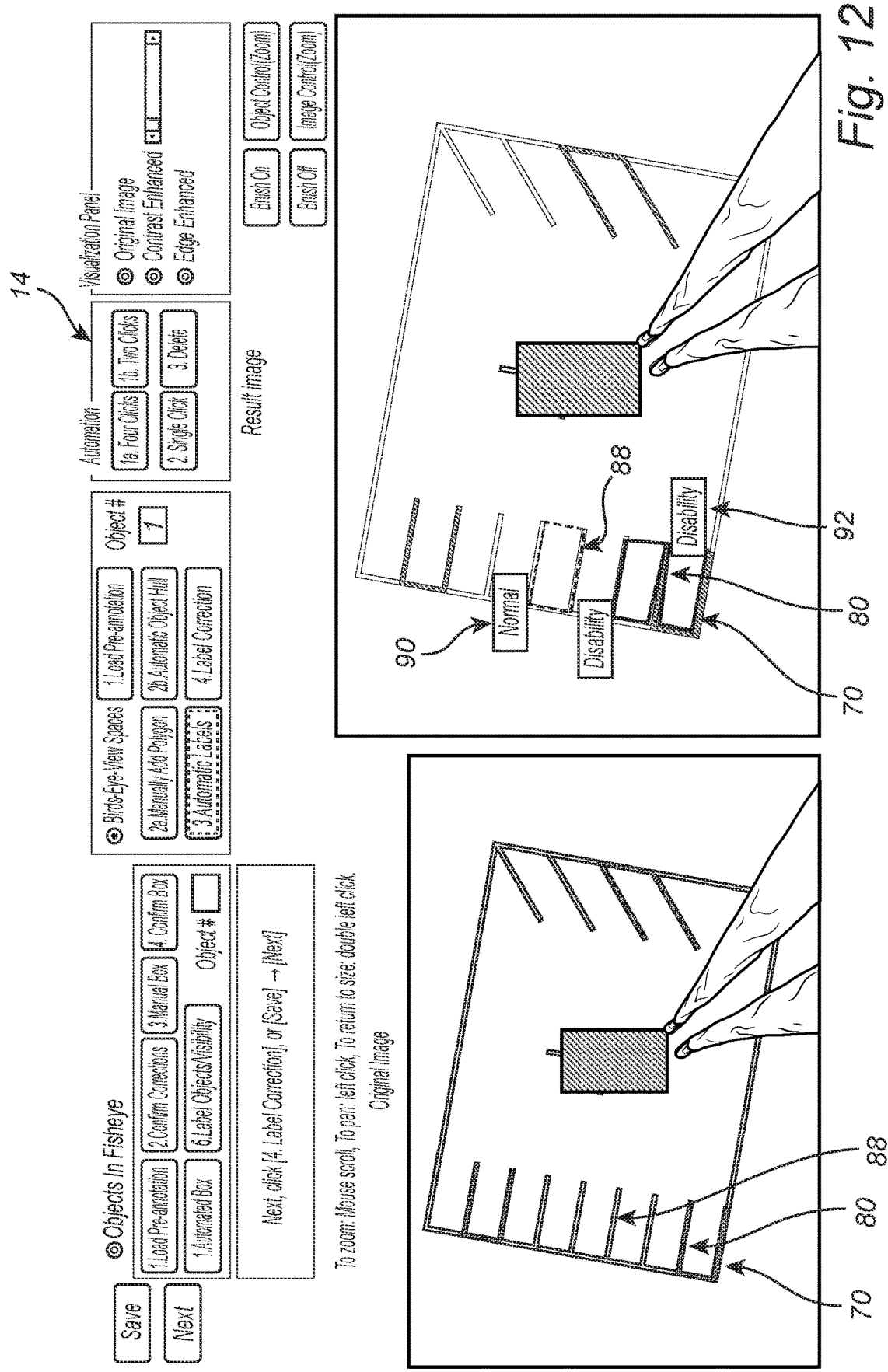
FIG. 12 is an exemplary stitched BEV camera image displayed on the GUI of the present disclosure, highlighting the automated generation and placement of "normal" and "disability" labels for segmented parking spots using the image segmentation and annotation algorithm.

FIG. 12 is an exemplary stitched BEV camera image displayed on the GUI 14, highlighting the automated generation and placement of "normal" and "disability" labels 90 and 92 for segmented parking spots 88, 80, and 70 using the image segmentation and annotation algorithm 40.

Figure 13:
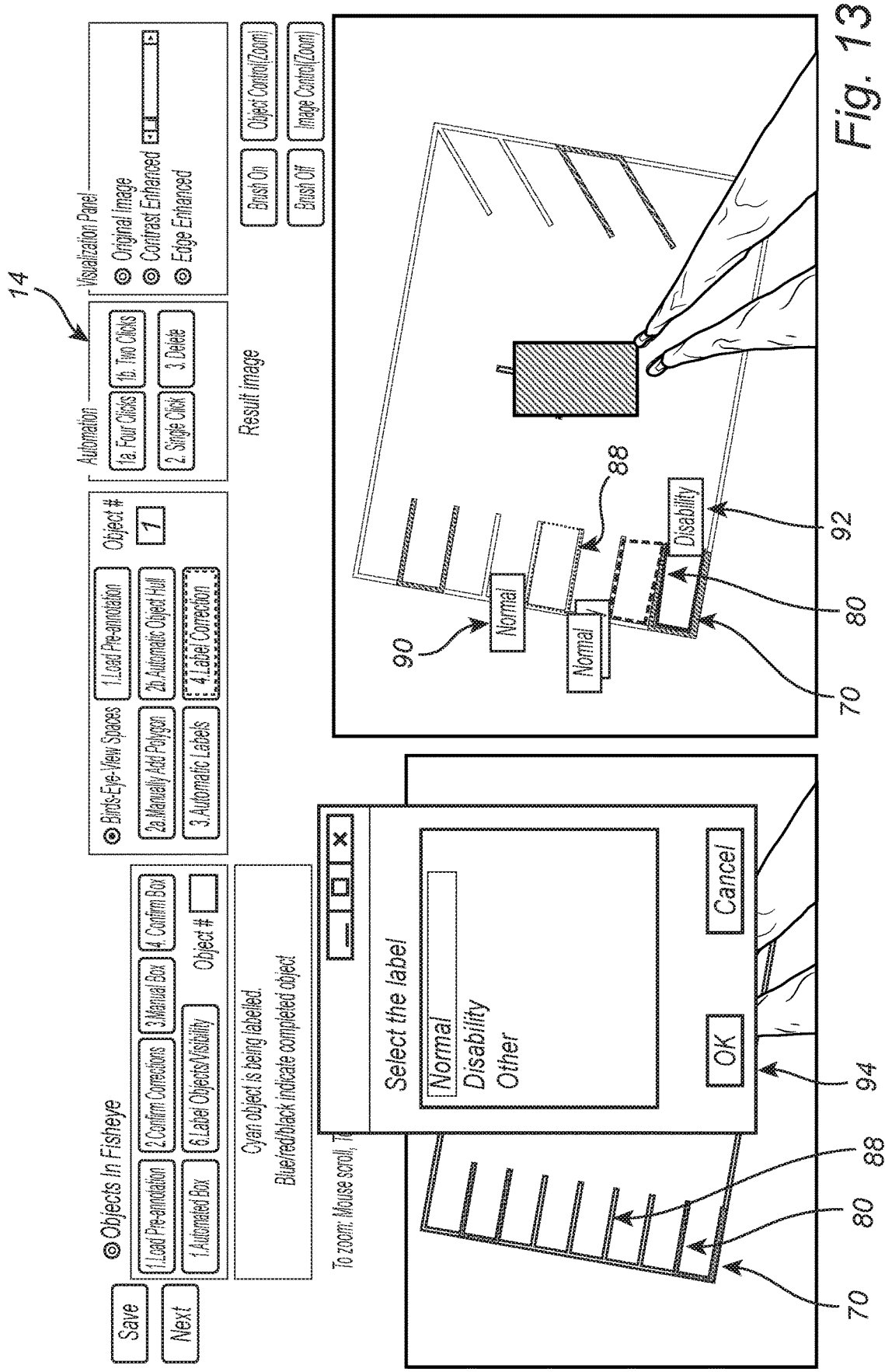
FIG. 13 is an exemplary stitched BEV camera image displayed on the GUI of the present disclosure, highlighting the manual correction of a "disability" label to a "normal" label for a segmented parking spot using a drop-down menu associated with the image segmentation and annotation algorithm.

Finally, FIG. 13 is an exemplary stitched BEV camera image displayed on the GUI 14, highlighting the manual correction of a "disability" label 92 to a "normal" label 90 for a segmented parking spot 80 using a drop-down menu 94 associated with the image segmentation and annotation algorithm 40.

Preferably, the software application of the present disclosure is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include the GUI 14 that enables a user to interact with the memory. Additionally, the I/O interfaces may further include an imaging device, i.e. camera, video camera, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionality.

Thus, the present disclosure provides methods and systems for the semi-automated segmentation and annotation of images for training vision-related machine learning models utilized by an ADS/ADAS or the like to identify and classify parking spots and other objects of interest. Given an image, such as a BEV image and/or a stitched image from one or more digital cameras, which may or may not be pre-annotated, these methods and systems involve a user selecting one or more fiduciary points associated with an object of interest. From the one or more selected fiduciary points, the software application is operable for automatically defining other fiduciary points and/or edges of the object of interest and either adding a bounding box or optimized polygon around the object of interest in an automated manner. Options are also available for manually adding such a bounding box or polygon. The bounding box is then adjusted, if necessary, and confirmed by the user. Likewise, the optimized polygon is then adjusted, if necessary, and confirmed by the user, with predetermined vertices (here, Vertex 1) identified to establish consistent polygon alignment, for example. Subsequently, an appropriate annotation is associated with the bounding box or polygon, either manually or in an automated manner. This annotation may be an object identifier, a visibility indicator, etc., and may be corrected manually as necessary. Finally, the segmented and annotated image information is output to a Json/text file or the like for later use in training the vision-related machine learning model. The user interacts with the software application via a user-friendly GUI. This whole process promotes accuracy and efficiency, especially in the determination of fiduciary points and/or edges and the placement of bounding boxes or optimized polygons.

The methods and systems of the present disclosure can function in either a development mode or a correction mode. In the development mode, an image is segmented and annotated from scratch. In the correction mode, a prior segmentation and annotation is corrected or updated using new criteria.

Figure 14:
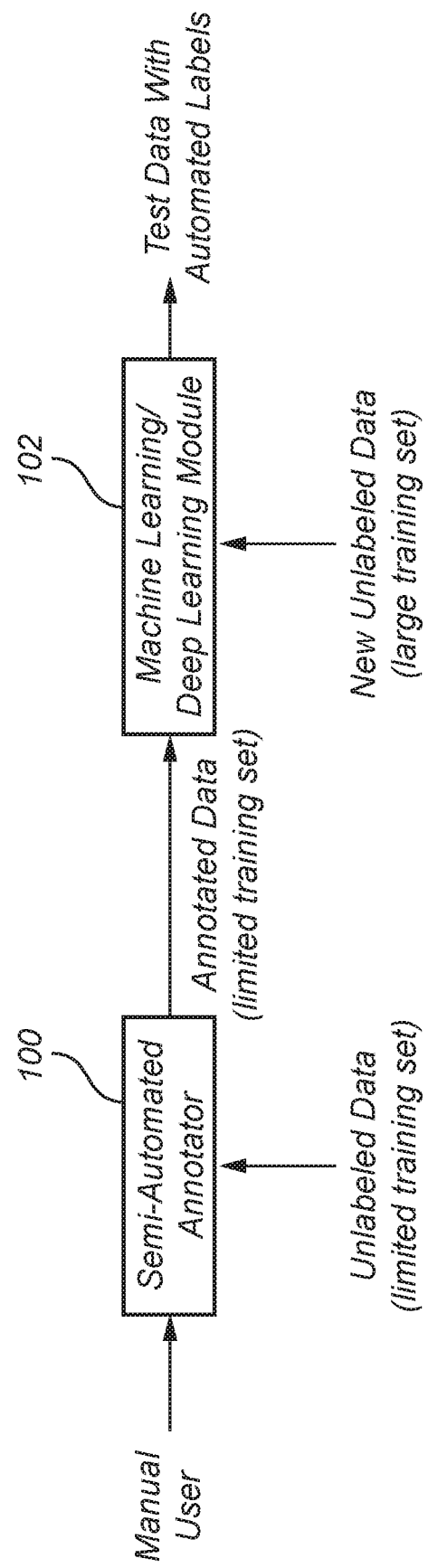
FIG. 14 is a flowchart illustrating one exemplary workflow for using the semi-automated annotator module of the present disclosure to generate 'annotated data' and then using this 'annotated data' as a training set to train a machine learning/deep learning module that, once trained, can generate automated labels on a large previously unseen test data set.

FIG. 14 illustrates one exemplary workflow for using the semi-automated annotator module 100 of the present disclosure to generate 'annotated data' and then using this 'annotated data' as a training set to train a machine learning/deep learning module 102 that, once trained, can generate automated labels on a large previously unseen test data set. This exemplary workflow ensures the manual annotators are independent of the machine learning/deep learning module 102 and the manual annotation process is not biased by the data or output of the machine learning model utilized.

Figure 15:
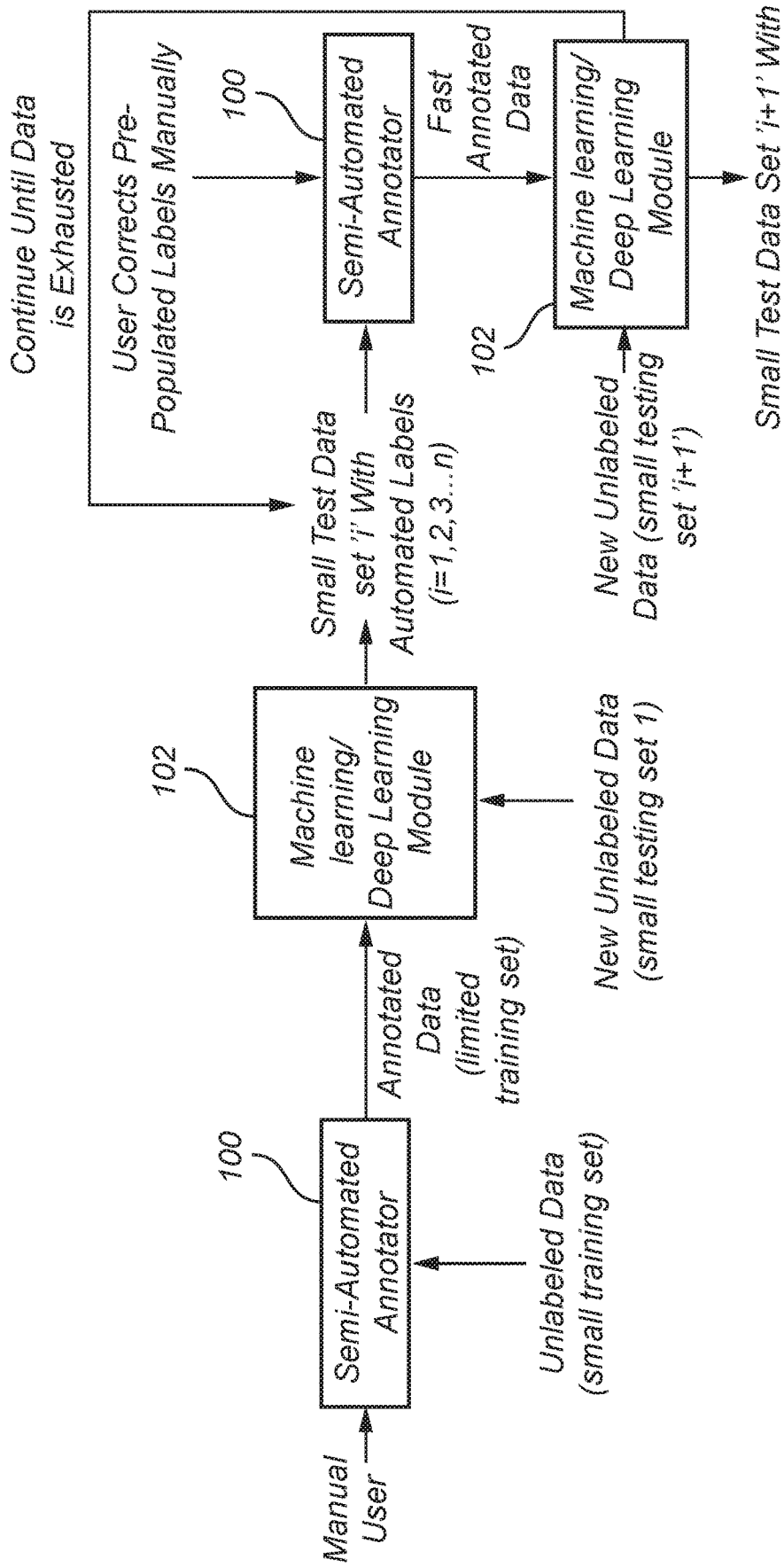
FIG. 15 is a flowchart illustrating another exemplary workflow for using the semi-automated annotator module of the present disclosure, highlighting operation in an active learning mode.

Alternatively, the semi-automated annotation system 100 can be utilized in an active learning mode, as shown in FIG. 15. Here, the data is annotated in small batches. The process initiates with a small training batch of data being annotated by the user manually using the annotation platform 100. Next, this annotated data is used to train the machine learning/deep learning module 102 that then predicts labels for a new small test data set batch (for example, batch i=1). These predicted labels are used as pre-annotation (i.e., known labels) by the annotation platform 100, with the manual annotator making corrections to the bounding box/polygon/labels and saving the changes (as fast annotated data). This process ensures that less manual annotation time is required since most bounding boxes/polygons/labels are pre-populated by the machine learning algorithm 102. Next, this batch of manually corrected test data (i.e., batch i) is used to retrain the machine learning/deep learning module 102, followed by using another small test batch (i.e., batch i+1) for which automated bounding boxes/polygons/labels are generated. Now, this new batch (i.e., i+1) becomes batch 'i' (i.e. i=i+1) and these pre-populated labels are fed back into the annotation platform 100 to be subjected to manual corrections and this process continues thereafter until the data is exhausted. The benefit of this process is that data is labelled in small sets/batches and the output of the machine learning module is treated as pre-annotation for a new test batch. However, although this active learning process may reduce manual annotation time, it may cause users to become biased regarding the position of bounding boxes and polygons, which may prove detrimental in certain situations; for example, if there are several small objects in the images that are incorrectly surrounded by bounding boxes, the pre-annotations will be offset and if the user is not attentive in making corrections, then the overall learning process may be offset/hampered as this active learning process is a continuous iterative process.

Although an ADS/ADAS is used as an example herein, it will be readily apparent to those of ordinary skill in the art that the methods and systems of the present disclosure can be used in any image segmentation and annotation application equally. Accordingly, examples related to generic object and parking spot detection provided herein are intended to be non-limiting for all purposes.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for digital image segmentation and annotation, comprising:
   receiving a digital image comprising an object of interest from an input file;
   adding a polygon around the object of interest to generate a segmented digital image;
   manually selecting a reference vertex from among vertices of the polygon;
   one or more of manually and automatically appending a label to the polygon around the object of interest to generate a segmented and annotated digital image, wherein the label indicates one or more of an identity and a characteristic of the object of interest; and
   outputting information related to the segmented and annotated digital image to an output file with the reference vertex coinciding with a predetermined reference position in the output file;
   wherein adding the polygon around the object of interest comprises manually selecting a region of interest associated with the object of interest, automatically displaying one or more of fiduciary points and fiduciary edges around the object of interest, manually brushing edges around the object of interest guided by the one or more of the fiduciary points and the fiduciary edges, and automatically convex hull estimating and displaying the polygon that encompasses all brushed pixels.

2. The method of claim 1, wherein the digital image comprises one or more of a singular digital image, a stitched digital image comprising a plurality of sub-images, a standard digital image, and a bird's eye view digital image.

3. The method of claim 1, wherein the polygon comprises one of a bounding box and a 4-point polygon.

4. The method of claim 1, wherein the convex hull estimating comprises estimating a largest diagonal that fits within the polygon that encompasses all the brushed pixels, specifying the largest diagonal by its endpoints, and traversing vertices of the polygon that encompasses all the brushed pixels in both clockwise and counterclockwise directions, wherein selected vertices that maximize an area of a triangle formed by the largest diagonal and the selected vertices in the clockwise and counterclockwise directions are selected as fiduciary points of the polygon that encompasses all the brushed pixels.

5. The method of claim 1, further comprising manually editing the polygon that encompasses all the brushed pixels.

6. The method of claim 1, further comprising circular shifting the vertices such that the reference vertex coincides with the predetermined reference position in the output file.

7. The method of claim 1, wherein the characteristic of the object of interest is determined by creating a binary mask corresponding to the polygon, gradient filtering red, green, and blue planes of the digital image to generate a gradient filtered image, superimposing the binary mask on the gradient filtered image, and characterizing/labeling the object of interest based on a mean and a standard deviation of pixel intensities of the superimposed binary mask and gradient filtered image.

8. The method of claim 1, further comprising one or more of:
in a standard learning mode, generating an annotated data set and using the annotated data set as a training data set to train a machine learning/deep learning module to generate automated labels for subsequent data sets; and
in an active learning mode, manually annotating a small data set, using the annotated small data set to train the machine learning/deep learning module and generating annotations for a new small data set i=1, using the new small annotated data set i=1 as a pre-annotation data set and making manual corrections thereto, using the new small annotated data set i=1 to retrain the machine learning/deep learning module after the manual corrections are made, iterating this process for a predetermined number of subsequent new small annotated data sets i=i+1, and automatically annotating a large data set.

9. A system for digital image segmentation and annotation, comprising:
a memory storing machine readable instructions that when executed by a processor cause the system to:
receive a digital image comprising an object of interest from an input file;
add a polygon around the object of interest to generate a segmented digital image;
receive a manually selected reference vertex from among vertices of the polygon;
one or more of manually and automatically append a label to the polygon around the object of interest to generate a segmented and annotated digital image, wherein the label indicates one or more of an identity and a characteristic of the object of interest; and
output information related to the segmented and annotated digital image to an output file with the reference vertex coinciding with a predetermined reference position in the output file;
wherein adding the polygon around the object of interest comprises manually selecting a region of interest associated with the object of interest, automatically displaying one or more of fiduciary points and fiduciary edges around the object of interest, manually brushing edges around the object of interest guided by the one or more of the fiduciary points and the fiduciary edges, and automatically convex hull estimating and displaying the polygon that encompasses all brushed pixels.

10. The system of claim 9, wherein the polygon comprises one of a bounding box and a 4-point polygon.

11. The system of claim 9, wherein the convex hull estimating comprises estimating a largest diagonal that fits within the polygon that encompasses all the brushed pixels, specifying the largest diagonal by its endpoints, and traversing vertices of the polygon that encompasses all the brushed pixels in both clockwise and counterclockwise directions, wherein selected vertices that maximize an area of a triangle formed by the largest diagonal and the selected vertices in the clockwise and counterclockwise directions are selected as fiduciary points of the polygon that encompasses all the brushed pixels.

12. The system of claim 9, wherein the system is further configured to receive a manual edit to the polygon that encompasses all the brushed pixels.

13. The system of claim 9, wherein the system is further configured to circular shift the vertices such that the reference vertex coincides with the predetermined reference position in the output file.

14. The system of claim 9, wherein the characteristic of the object of interest is determined by creating a binary mask corresponding to the polygon, gradient filtering red, green, and blue planes of the digital image to generate a gradient filtered image, superimposing the binary mask on the gradient filtered image, and characterizing/labeling the object of interest based on a mean and a standard deviation of pixel intensities of the superimposed binary mask and gradient filtered image.

15. The system of claim 9, wherein the system is configured to operate in one or more of:
a standard learning mode operable for generating an annotated data set and using the annotated data set as a training data set to train a machine learning/deep learning module to generate automated labels for subsequent data sets; and
an active learning mode operable for manually annotating a small data set, using the annotated small data set to train the machine learning/deep learning module and generating annotations for a new small data set i=1, using the new small annotated data set i=1 as a pre-annotation data set and making manual corrections thereto, using the new small annotated data set i=1 to retrain the machine learning/deep learning module after the manual corrections are made, iterating this process for a predetermined number of subsequent new small annotated data sets i=i+1, and automatically annotating a large data set.

16. A non-transitory computer-readable medium comprising digital image segmentation and annotation instructions stored in a memory and executed by a processor to carry out the steps, comprising:
receiving a digital image comprising an object of interest from an input file;
adding a polygon around the object of interest to generate a segmented digital image;
receiving a manually selected reference vertex from among vertices of the polygon;
one or more of manually and automatically appending a label to the polygon around the object of interest to generate a segmented and annotated digital image, wherein the label indicates one or more of an identity and a characteristic of the object of interest; and outputting information related to the segmented and annotated digital image to an output file with the reference vertex coinciding with a predetermined reference position in the output file;

wherein adding the polygon around the object of interest comprises manually selecting a region of interest associated with the object of interest, automatically displaying one or more of fiduciary points and fiduciary edges around the object of interest, manually brushing edges around the object of interest guided by the one or more of the fiduciary points and the fiduciary edges, and automatically convex hull estimating and displaying the polygon that encompasses all brushed pixels.

17. The non-transitory computer-readable medium of claim 16, wherein the digital image comprises one or more of a singular digital image, a stitched digital image comprising a plurality of sub-images, a standard digital image, and a bird's eye view digital image.

18. The non-transitory computer-readable medium of claim 16, wherein the polygon comprises one of a bounding box and a 4-point polygon.

\* \* \* \* \*